2,797,229
Patented June 25, 1957

2,797,229

11,17,21-TRIHYDROXY-4,6-PREGNADIEN-3,20-DIONE AND 21-MONOESTERS THEREOF

Jack W. Ralls, Morton Grove, Ill., assignor, by mesne assignments, to G. D. Searle & Co., Skokie, Ill., a corporation of Delaware No Drawing. Application September 13, 1954,
Serial No. 455,802

4 Claims. (Cl. 260—397.45)

The present invention relates to novel cyclopentanophenanthrene compounds and specifically to 11,17,21-trihydroxy-4,6-pregnadien-3,20-dione and its 21-monoesters of the structural formula

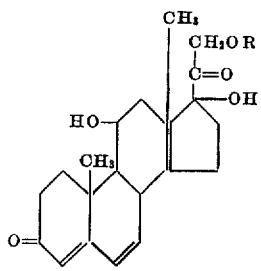

wherein R is hydrogen or an acyl radical derived from a hydrocarbon carboxylic acid e. g. formic, acetic, propionic, butyric, valeric, caproic, cyclopentaneacetic, cyclopentanepropionic, cyclohexanepropionic, benzoic, toluic acid and the like.

My invention provides new potent medicinal agents with strong adrenocorticoid properties. These new agents cause a powerful stimulation of the reticuloendothelial system. They are superior to the naturally occurring steroids in that they lack undesirable side effects in therapeutic dosage.

The desired compounds are prepared by a biochemical oxidation of 17,21-dihydroxy-4,6-pregnadien-3,20-dione and 21-monoesters thereof, 17-hydroxy-4,6-pregnadien-3,20-dione, and of 4,6-pregnadien-3,20-dione. While some oxidation can be achieved by use of adrenal homogenates and mashes, the desired oxidation is carried out in better yield by exposing the steroids to circulation through a surviving mammalian adrenal gland using a perfusion medium such as blood.

The process is probably of an aerobic nature. However, it has been found that a moderately aerated perfusion medium gives satisfactory yields. A typical experiment is described below. It will be obvious to biochemists skilled in the art that numerous modifications of this procedure can be practiced and the invention is therefore not to be construed as limited by the experimental details set forth. In the examples, the temperature is indicated in degrees centigrade (° C.) and quantities of materials in parts by weight.

This application is a continuation-in-part of my copending applications Serial No. 297,405, filed July 5, 1952, U. S. Patent No. 2,715,640, and Serial No. 377,699, filed August 31, 1953, now abandoned.

Example 1

A solution of 1 part of 4,6-pregnadiene-3,20-dione (cf. Helvetica Chimica Acta, vol. 23, 388; 1940) in 80 parts of propylene glycol is added to a mixture of 5000 parts of citrated beef blood and 5000 parts of normal physiological saline solution. The resulting solution is perfused three times through ten surviving beef adrenal glands, cannulated through the vein and having a finely lacerated surface. The perfusate is frozen and thawed and the hemolyzed blood is extracted with isopropyl acetate. This extract is washed with aqueous sodium chloride solution, dried by azeotropic distillation and concentrated to a volume of about 25 parts. This residue is diluted with 380 parts of benzene and poured into a chromatography column containing 100 parts of silica gel. The column is washed with 2000 parts of a 5% and 1000 parts of a 10% solution of ethyl acetate in benzene. It is then eluted with 1000 parts of a 10% and 500 parts of a 20% solution of ethyl acetate in benzene; concentration of these eluates yields unconverted 4,6-pregnadien-3,20-dione. The column is washed with 500 parts of a 20%, 1000 parts of a 33% and 1500 parts of a 50% solution of ethyl acetate in benzene. Elution with 500 parts of a 50% solution and evaporation of the eluate yields a material melting at about 183° C., which has the empirical formula $C_{19}H_{26}O_3$. The ultraviolet absorption spectrum shows a maximum at 238 millimicrons with a molecular extinction coefficient of 12,700. The molecular rotation of a chloroform solution is $[\alpha]_D = -88°$. The Zimmermann and blue tetrazolium test are negative.

The column is further eluted with 1000 parts of a 67% solution of ethyl acetate in benzene. Evaporation of the eluate under vacuum and crystallization of the residue from ethyl acetate yields 6-dehydro-17-hydroxy-corticosterone melting at about 231° C. The ultraviolet absorption spectrum shows a maximum at 283 millimicrons with a molecular extinction coefficient of 23,400. The blue tetrazolium test is positive. The compound gives a strong green fluorescence with concentrated sulfuric acid. The 11,17,21-trihydroxy-4,6-pregnadien-3,20-dione has the structural formula

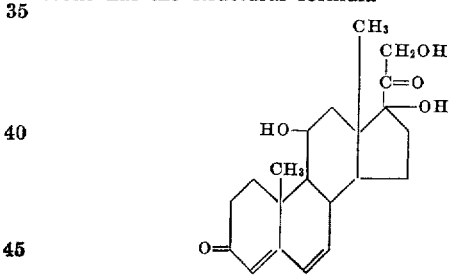

Example 2

10 parts of the 11,17,21-trihydroxy-4,6-pregnadien-3,20-dione obtained in the preceding example are dissolved in a minimal amount of anhydrous pyridine and then treated with 44 parts of acetic anhydride. After 12 hours storage at room temperature the mixture is poured into ice water. The resulting precipitate is collected on a filter and recrystallized from acetone and low boiling petroleum ether. The 11,17-dihydroxy-21-acetoxy-4,6-pregnandien-3,20-dione thus obtained melts at about 227–229° C. with decomposition. The product is identical with that obtained in the following manner.

To a hot solution of 1 part of the 3,20-bis-ethyleneketal (or 3,20-bistrimethyleneketal) of 11β,17-dihydroxy-21-acetoxy-5-pregnene-3,20-dione in 300 parts of chloroform there are added 0.54 part of N-bromosuccinimide and the mixture is refluxed for 10 minutes under a bright light. 0.2 part of γ-collidine are added and the reaction mixture is chilled, washed with water, dried over anhydrous calcium sulfate, filtered, diluted with 100 parts of anhydrous xylene and concentrated to about one-eighth of its original volume. The yellow residue is treated with 0.4 part of γ-collidine, refluxed for a half hour and then concentrated to dryness under vacuum.

A solution of 1 part of the 20-ethyleneketal of 11β,17-dihydroxy-21-acetoxy-4,6-pregnadiene-3,20-dione obtained in 80 parts of methanol is treated with 10 parts of an 8% alcoholic solution of sulfuric acid and refluxed for 40 minutes. The reaction mixture is diluted with a large volume of water and extracted with ether. The ether solution is washed successively with water, dilute sodium hydrogen carbonate to neutrality and again with water and evaporated. 5 parts of the residue are dissolved in a minimum of pyridine and treated with 22 parts of acetic anhydride. The mixture is stored at room temperature for 12 hours and then poured into ice water. The resulting precipitate is recrystallized from acetone and low boiling petroleum ether to yield 11,17-dihydroxy-21-acetoxy-4,6-pregnadien-3,20-dione. A mixed melting point sample with the prodluct obtained hereinabove shows no lowering in melting point.

*Example 3*

Substitution of 65 parts of butyric anhydride for the 44 parts of acetic anhydride used in the preceding example yields 11,17-dihydroxy-17-butyroxy-4,6-pregnadiene-3,20-dione. The infrared absorption spectrum show maxima at 2.98, 5.85, 6.08, 6.22, 7.92, and 8.08 microns.

*Example 4*

To a solution of 2 parts of 11,17,21-trihydroxy-4,6-pregnadien-3,20-dione in a minimum of pyridine are added 4 parts of benzoyl chloride and the mixture is maintained at 25° C. for 24 hours. The mixture is then diluted with ether, washed successively with water, 5% aqueous sodium hydroxide, and again with water, dried over anhydrous calcium sulfate, filtered and evaporated. The residue is washed with benzene. There is thus obtained 11,17-dihydroxy-21-benzoyloxy - 4,6 - pregnadien-3,20-dione which shows infrared maxima at 2.97, 5.86, 6.06, 6.22, 7.84, and 13.87 microns.

*Example 5*

Substitution of 4.5 parts of β-cyclopentanepropionyl chloride for the benzoyl chloride used in the preceding example yields the 11,17-dihydroxy-21-cyclopentylpropionyloxy-4,6-pregnadien-3,20-dione which shows infrared maxima at 2.96, 5.85, 6.09, 6.22, 7.94, and 8.08 microns.

I claim:
1. A compound having the formula

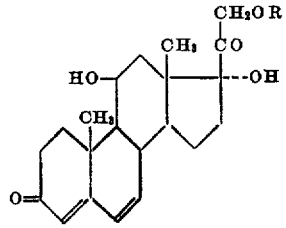

wherein R is selected from the group consisting of hydrogen and a lower hydrocarbon carboxylic acid radical.
2. 11,17,21-trihydroxy-4,6-pregnadien-3,20-dione.
3. 21-monoester of a hydrocarbon carboxylic acid containing less than 9 carbon atoms and 11,17,21-trihydroxy-4,6-pregnadien-3,20-dione.
4. 11,17-dihydroxy-21-acetoxy - 4,6 - pregnadien-3,20-dione.

References Cited in the file of this patent
UNITED STATES PATENTS
2,691,030    Murray ------------------ Oct. 5, 1954

UNITED STATES PATENT OFFICE
Certificate of Correction

Patent No. 2,797,229                                                       June 25, 1957

Jack W. Ralls

It is hereby certified that error appears in the printed specification of the above numbered patent requiring correction and that the said Letters Patent should read as corrected below.

Column 1, lines 19 to 29, inclusive, the formula should appear as shown below instead of as in the patent—

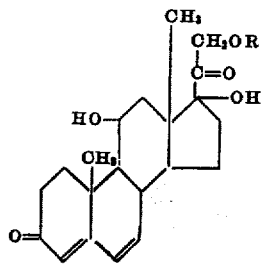

column 3, line 14, for "prodluct" read —product—; line 22, for "show" read —shows—.

Signed and sealed this 24th day of September 1957.

[SEAL]

Attest:
KARL H. AXLINE,
*Attesting Officer.*
                                                              ROBERT C. WATSON,
                                                               *Commissioner of Patents.*